US011865446B2

(12) United States Patent
Stafford

(10) Patent No.: US 11,865,446 B2
(45) Date of Patent: *Jan. 9, 2024

(54) INTERACTIVE WHAT-IF GAME REPLAY METHODS AND SYSTEMS

(71) Applicant: Sony Interactive Entertainment Inc., Tokyo (JP)

(72) Inventor: Jeffrey Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,280

(22) Filed: Jun. 28, 2022

(65) Prior Publication Data

US 2022/0323861 A1 Oct. 13, 2022

Related U.S. Application Data

(63) Continuation of application No. 16/837,426, filed on Apr. 1, 2020, now Pat. No. 11,369,871.

(51) Int. Cl.
*A63F 13/497* (2014.01)
*A63F 13/47* (2014.01)
*G06N 20/00* (2019.01)
*G07F 17/32* (2006.01)

(52) U.S. Cl.
CPC ............ *A63F 13/497* (2014.09); *A63F 13/47* (2014.09); *G06N 20/00* (2019.01); *G07F 17/3227* (2013.01); *G07F 17/3237* (2013.01)

(58) Field of Classification Search
None
See application file for complete search history.

(56) References Cited

U.S. PATENT DOCUMENTS

| | | | | |
|---|---|---|---|---|
| 2011/0183749 A1* | 7/2011 | Allen | ............... | G07F 17/3211 463/25 |
| 2013/0274014 A1* | 10/2013 | Rom | ............... | A63F 13/537 463/31 |
| 2014/0228112 A1* | 8/2014 | Laakkonen | ............... | G11B 27/32 463/31 |
| 2015/0018060 A1* | 1/2015 | Naveh | ............... | G06Q 10/0637 463/9 |
| 2019/0189020 A1* | 6/2019 | Punia | ............... | G06F 16/9535 |
| 2019/0294922 A1* | 9/2019 | Clark | ............... | A63F 13/67 |

* cited by examiner

*Primary Examiner* — Jason T Yen
(74) *Attorney, Agent, or Firm* — Penilla IP, APC

(57) ABSTRACT

Methods and systems are provided for generating an outcome of a previous gameplay. The method includes providing access of a recording of the previous gameplay, the recording is one that was shared by a player for the previous gameplay. The method includes providing an interface that identifies one or more what-if scenarios for the previous gameplay. The one or more what-if scenarios being selected for inclusion into the interface is based on processing the recording of the previous gameplay through a machine learning model to identify what-if scenarios for the user, and options for what-if scenarios are provided to the interface. The method includes enabling the selection of at least one of the what-if scenarios from the options. The selection causes an adjustment to metadata associated with the recording of the previous gameplay. The method includes replaying the recording that was selected using the adjusted metadata to generate the alternative outcome of the previous gameplay.

15 Claims, 8 Drawing Sheets

| "What-If" Scenario | Descriptive Features | Original Metadata | Updated Metadata |
|---|---|---|---|
| WIF1 | All mountain skis | P1, P5, P8 | P1', P5', P8' |
| WIF2 | Deep snow skis | P3, P5, P9 | P3', P5', P9' |
| WIF3 | Hard snow skis | P2, P7, P10 | P2', P7', P10' |
| WIF4 | Frontside skis | P1, P6, P7 | P1', P6', P7' |
| WIF5 | Comfort Boots | P11, P14 | P11', P14' |
| WIF6 | High Performance Boots | P13, P15 | P13', P15' |
| WIF7 | Alpine Bindings | P14, P16 | P14', P16' |
| WIF8 | Frame AT Bindings | P17, P20 | P17', P20' |
| WIF9 | Tech AT Bindings | P14 ,P19 | P14' ,P19' |
| WIF10 | Long ski poles | P22, P25 | P22', P25' |
| WIF11 | Short ski poles | P21 ,P22 | P21' ,P22' |
| WIF12 | Short Skier | P31, P33 | P31', P33' |
| WIF13 | Tall Skier | P32, P37 | P32', P37' |
| WIF14 | Light Skier | P33, P38 | P33', P38' |
| WIF15 | Heavy Skier | P32, P34 | P32', P34' |
| WIF16 | Beginner skier | P41, P44 | P41', P44' |
| WIF17 | Intermediate skier | P42, P45 | P42', P45' |
| WIF18 | Advance skier | P41, P43 | P41', P43' |
| WIFN | Expert skier | P47, P49 | P47', P49' |

"What-If" Metadata Profile Table

| "What-If" Scenario | Descriptive Features | Original Metadata | Updated Metadata |
|---|---|---|---|
| WIF1 | All mountain skis | P1, P5, P8 | P1', P5', P8' |
| WIF2 | Deep snow skis | P3, P5, P9 | P3', P5', P9' |
| WIF3 | Hard snow skis | P2, P7, P10 | P2', P7', P10' |
| WIF4 | Frontside skis | P1, P6, P7 | P1', P6', P7' |
| WIF5 | Comfort Boots | P11, P14 | P11', P14' |
| WIF6 | High Performance Boots | P13, P15 | P13', P15' |
| WIF7 | Alpine Bindings | P14, P16 | P14', P16' |
| WIF8 | Frame AT Bindings | P17, P20 | P17', P20' |
| WIF9 | Tech AT Bindings | P14, P19 | P14', P19' |
| WIF10 | Long ski poles | P22, P25 | P22', P25' |
| WIF11 | Short ski poles | P21, P22 | P21', P22' |
| WIF12 | Short Skier | P31, P33 | P31', P33' |
| WIF13 | Tall Skier | P32, P37 | P32', P37' |
| WIF14 | Light Skier | P33, P38 | P33', P38' |
| WIF15 | Heavy Skier | P32, P34 | P32', P34' |
| WIF16 | Beginner skier | P41, P44 | P41', P44' |
| WIF17 | Intermediate skier | P42, P45 | P42', P45' |
| WIF18 | Advance skier | P41, P43 | P41', P43' |
| WIFN | Expert skier | P47, P49 | P47', P49' |

Fig. 6A

Composite "What-If" Metadata Profile Table

| "What-If" Scenario Combinations | Descriptive Features | Original Metadata | Updated Metadata |
|---|---|---|---|
| WIF1 + WIF5 + WIF18 | All mountain skis | P1, P5, P8 | P1', P5', P8' |
| | Comfort Boots | P11, P14 | P11', P14' |
| | Advance skier | P41, P43 | P41', P43' |
| WIF3 + WIF6 + WIF16 | Hard snow skis | P2, P7, P10 | P2', P7', P10' |
| | High Performance Boots | P13, P15 | P13', P15' |
| | Beginner skier | P41, P44 | P41', P44' |
| WIF4 + WIF17 | Frontside skis | P1, P6, P7 | P1', P6', P7' |
| | Intermediate skier | P42, P45 | P42', P45' |

Fig. 6B

INTERACTIVE WHAT-IF GAME REPLAY METHODS AND SYSTEMS

CLAIM OF PRIORITY

This application is a Continuation of and claims priority to and the benefit of U.S. patent application Ser. No. 16/837,426, filed on Apr. 1, 2020 (U.S. Pat. No. 11,369,871, issued on Jun. 28, 2022), entitled "Interactive What-If Game Replay Methods and Systems" the disclosure of which is incorporated herein by reference in its entirety for all purposes.

BACKGROUND

1. Field of the Disclosure

The present disclosure relates to generating an alternative outcome of a previous gameplay for a user using previously recorded gameplay sessions from a player.

2. Description of the Related Art

The video game industry has seen many changes over the years. The video game industry has been trying to find ways to enhance a user's engagement level in video games in order to increase retention levels and increase video game revenue. To this end, video game developers have been seeking ways to incorporate sophisticated operations that may assist a user with their gameplay and make it more appealing.

A growing trend in the video game industry is to develop video game features that would enhance the gaming experience of users by providing users with a way of knowing the outcome of a particular event in the video game. Having a glimpse into the video game and knowing how the video game ends may lead to an enhanced user engagement. Unfortunately, users must generally spend a significant amount of time playing and exploring various features in the video game to determine the outcome of the video game. This may result in the user being frustrated with the video game and subsequently lead to a decrease in users playing video games.

It is in this context that implementations of the disclosure arise.

SUMMARY

Implementations of the present disclosure include devices, methods and systems relating to generating an outcome of a previous gameplay using previous gameplay recordings from a player. In some embodiments users are provided with one or more what-if scenarios that correspond to feature changes in a video game. The selection of at least one what-if scenario can cause the system to generate a new outcome that may be different than the original outcome. In one embodiment, the what-if scenarios provided to a user may be customized for each user. The what-if scenarios selected for a particular user may be based on a machine learning model that analyzes a profile of the user and the recordings of the previous gameplay to predict various what-if scenarios that the user may be interested in. Thus, users may easily select a what-if scenario to quickly determine its corresponding outcome without having to utilize a significant amount of time and resources to play the game to determine its outcome.

In one embodiment, a method for generating an outcome of a previous gameplay is disclosed. In this embodiment, the method includes providing access of a recording of the previous gameplay, the recording is one that was shared by a player for the previous gameplay. The method includes providing an interface that identifies one or more what-if scenarios for the previous gameplay. The one or more what-if scenarios being selected for inclusion into the interface is based on processing the recording of the previous gameplay through a machine learning model to identify what-if scenarios for the user, and options for what-if scenarios are provided to the interface. The method includes enabling the selection of at least one of the what-if scenarios from the options. The selection causes an adjustment to metadata associated with the recording of the previous gameplay. The method includes replaying the recording that was selected using the adjusted metadata to generate the alternative outcome of the previous gameplay.

In another embodiment, a method for generating an alternative outcome of a previous gameplay for a game is disclosed. In this embodiment, the method includes providing access of a recording of the previous gameplay. The recording is one that was shared by a player for the previous gameplay. The method includes providing an interface that identifies one or more what-if scenarios for the previous gameplay. The one or more what-if scenarios being selected for inclusion as options into the interface is based on identifying features that are pre-defined to be adjustable for the game. The method includes enabling the selection of at least one of the what-if scenarios from the options. The selection causes an adjustment to metadata associated with the recording of the previous gameplay. The method includes replaying the recording that was selected using the adjusted metadata to generate the alternative outcome of the previous gameplay.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 6A illustrates an embodiment of a what-if metadata profile table for a video game, in accordance with an implementation of the disclosure.

FIG. 6B illustrates an embodiment of a composite what-if metadata profile table for a video game, in accordance with an implementation of the disclosure.

DETAILED DESCRIPTION

Figure 1:
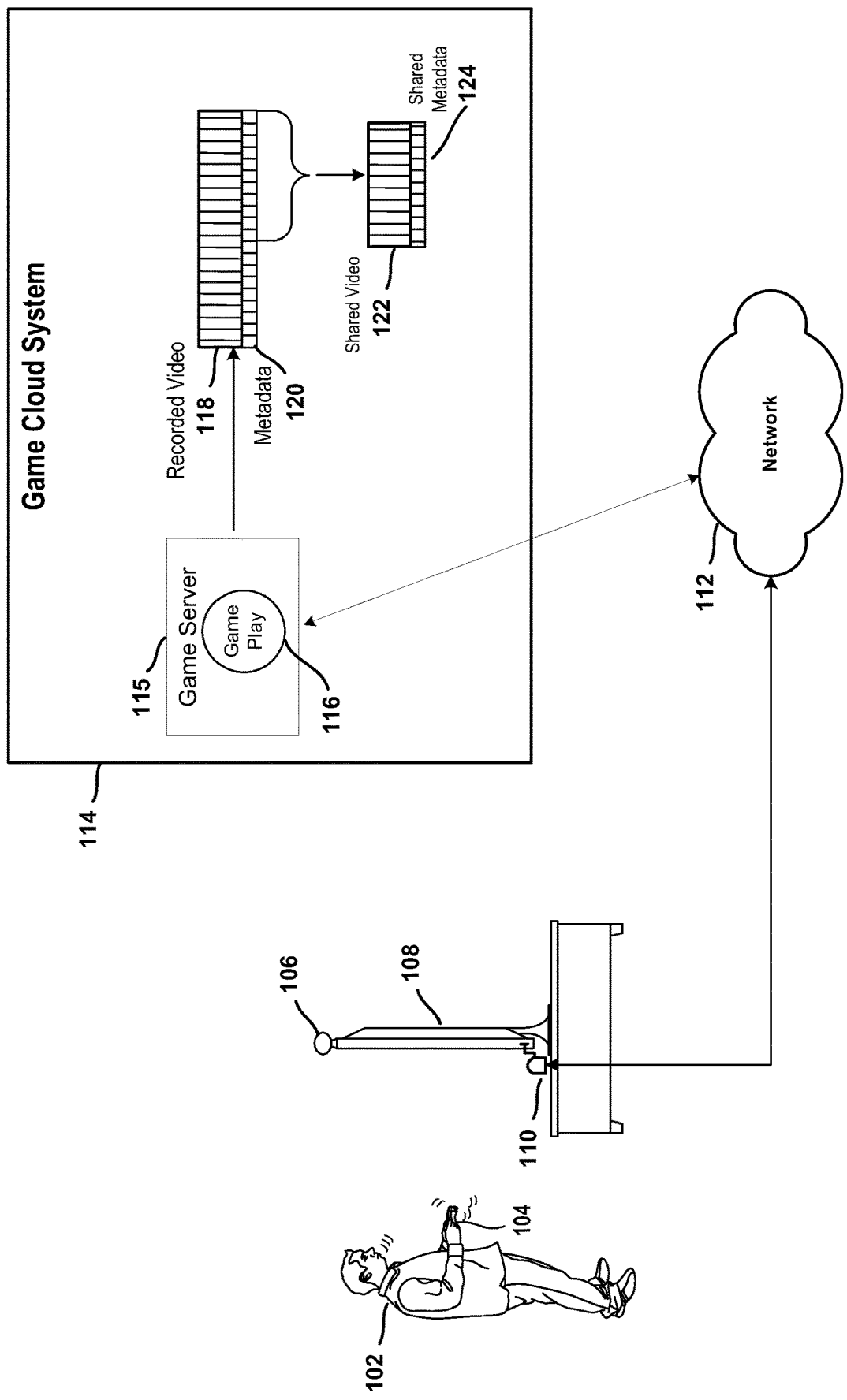
FIG. 1 illustrates an embodiment of a game cloud system configured to execute a gameplay of a player and to process a video recording that can be used to generate an alternative outcome of a previous gameplay, in accordance with an implementation of the disclosure.

The following implementations of the present disclosure provide devices, methods, and systems for generating an alternative outcome of a previous gameplay. In particular, the present disclosure provides users with options for what-if scenarios to a previously recorded game session that can be selected by the user to recreate the previous gameplay to view a new outcome that may be different than the original outcome. By way of example, providing users with what-of scenarios is facilitated by a game cloud system that processes shared video recordings of the previous gameplay of players. In one embodiment a method is disclosed that enables generating alternative outcomes of a previous gameplay. The method includes providing access of a recording of the previous gameplay. In one embodiment, the recording can be one that was shared by a player for the previous gameplay. In addition, the method further includes providing an interface that identifies one or more what-if scenarios for the previous gameplay. The one or more what-if scenarios selected for inclusion into the interface may be customized and based on processing the recording of the previous gameplay through a machine learning model to identify a set of what-if scenarios for the user. Thus, the interface may include customized options for the what-if scenarios for each user to select from.

Further, the method includes enabling the selection of at least one of the what-if scenarios from the options. The selection may cause an adjustment to metadata associated with the recording of the previous gameplay. Additionally, the method further includes replaying the recording that was selected by a user using the adjusted metadata to generate the alternative outcome of the previous gameplay. Generally, the previous gameplay may include a plurality of games played by one or more players. In addition, the recording of the previous gameplay may be selectively shared by the one or more players for inclusion into the PlayStation Network (PSN). As used herein, the PSN is only one example service provider for gaming, and any type of cloud gaming system, website, platform, streaming service, interface, client and/or server system may implement features associated with the what-if functionality described wherein. Further, it will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for generating an alternative outcome of a previous gameplay. For example, the system includes one or more players connected over a network. The player may be playing a video game using an interface object such as handheld controllers that enable the player to interact with the game. The system may also include a camera that is used to view and track the user during the gameplay. In some embodiments, the gameplay may be presented on a separate device such as a monitor or television. In some embodiments, the system may include a game cloud system that is configured to execute the video game and enable connections to the one or more players when hosting the game. The game cloud system may include one or more game servers that are configured to receive, process, and execute data from the plurality of players. In one embodiment, the game server may be configured to generate video recordings of the active gameplay of the one or more players. In some embodiments, a video recording associated with a player's gameplay may be shared by the player which can be used for processing by an artificial intelligence (AI) module to determine one or more what-if scenarios.

In accordance with another embodiment, the game cloud system may process a recording of a player's gameplay and its corresponding metadata. In some embodiments, the player may designate a portion of the recorded video (or any associated data that can be used to recreate the gameplay) to be shared with others (e.g., via a cloud gaming system). In one embodiment, the length of the shared video recording will vary and depend on how much of the recorded video a player chooses to share. For example, a player who is playing a fighting game may choose to share only the first and third rounds of a five round match. The first and third round may include actions where the player dominants their opponent and wishes to share only the scenes when the player was successful. In other embodiments, the user may wish to share a recently played portion of the game, e.g., triggered using a share button of a controller or a voice command. The shared portion of the game can, in some embodiments, be manually selected to identify a start and a stop for a recoding clip, or the recording clip can be automatically selected for the user using machine learning analysis.

In accordance with another embodiment, the system includes generating a game list interface that includes a listing of one or more games that can be selected by a user. The game list, in some examples, may be a game lobby or an interface that identifies games the user is playing or games that are available for play. In some embodiments, each game may include a corresponding a preview of the game. In addition, each game may include features that enable the user to instant play a demo of the game, view recordings of the game, and various other options (e.g., view similar games, purchase game, rent game, etc.).

For example, a user may select the option to play a demo of the game to get a feel for the game to determine whether the game is interesting. In accordance with another embodiment, if a user selects the option to view recordings of the game, the system can generate a recording list interface that includes a list of shared recordings for the particular video game that have been shared other players. In some embodiments, the recording list interface may include a game thumbnail of the selected game that provides a preview of the selected game. In addition, the recording list interface may include one or more shared recordings that are selectable by a user. In some embodiments, each shared recording may include a thumbnail showing a preview of the shared recording and the name of the specific player that shared the recording.

In accordance with one embodiment, after the user selects a shared recording to view, the system can generate one or more what-if scenarios that correspond to the shared recording that was selected by the user. In some embodiments, the what-if scenarios can be customized for each user and generated by an AI module. In one embodiment, the AI module uses one or more models that can be trained using training data or be trained on-the-fly by processing game play selections by users of the game cloud system. The AI module includes feature processing and classification, to enable rule based decision making.

In one embodiment, the AI module can be configured to receive a profile of the user and the recordings of the previous gameplay to identify various what-if scenarios that the user might be interested in. In accordance with some embodiments, each user may have a customize list of what-if scenario options that may be of interest to the specific user. For example, a user selects a shared recording of a scene in an Olympic skiing game. In particular, the selected recording is a recording of a half-pipe competition. The AI module may process a profile of the user which indicates that the user's previous gameplay of the half-pipe competition was unsuccessful and that the user previously used all mountain skis and comfort boot during the half-pipe event. When generating the what-if scenario options for the user, the AI module may generate what-if scenario that includes different ski equipment that was not previously used by the user (e.g., hard snow skis, frontside skis, high performance boots, short ski poles, etc.). Therefore, in this embodiment, the what-if scenarios provided to a user may be generated based on the user's profile and the selection of the what-if scenarios may be scenarios that the user may have an interest in knowing its outcome.

In accordance with another embodiment, after the user selects a what-if scenario for generating an alternative outcome, the system can adjust the metadata associated with the shared video recording of the previous gameplay. In some embodiments, the selection of a what-if scenario may cause one or more parameters associated with the shared metadata to be adjusted. Using the adjusted metadata, the system can replay the recording to generate an alternative outcome of the previous gameplay.

In accordance with another embodiment, each what-if scenario may include descriptive features that correspond to a particular what-if scenario. The descriptive features may describe which features are changed in the game and the corresponding metadata parameters that are associated with the feature. Accordingly, when a user selects a what-if scenario to generate an alternative outcome for a specific recording, the parameters in the original metadata can be adjusted to reflect the selected what-if scenario. In some embodiments, more than one what-if scenario may be selected and combined to replay the recording.

In another embodiment, the system may include an AI module that is configured to identify one or more what-if scenario options for inclusion into the shared recording interface. In one embodiment, the AI module is configured to receive a plurality of shared video recordings as input. In some embodiments, the shared video recordings are selected and shared by one or more players. The shared video recordings may include recordings of different video games and those that are played by different players. In one embodiment, the what-if scenarios that are selected by the user are also used as a feedback input to the AI module. Such inputs can be used for re-enforced learning. As the user makes selections, the user's machine learning model becomes more personalized for the user.

With the above overview in mind, the following provides several example figures to facilitate understanding of the example embodiments.

FIG. 1 illustrates an embodiment of a game cloud system 114 that is configured to execute a gameplay of a player 102 and to process a shared video recording 122 that can be used to generate an alternative outcome of a previous gameplay. In some embodiments, the system can process other types of data related to the game play, and need not only be video recording data. For instance, other data can include session data, metadata regarding actions taken during game play, metadata from the game itself, processed metadata, state data generated during game play, or combination thereof. As shown in FIG. 1, player 102 is playing a game. In one configuration, at the player 102 side, it is shown that the player 102 is playing a game with a controller 104, and is viewing a monitor 108. The monitor may be connected to a computer 110 for connection to a game cloud system 114. In some embodiments, the user may be playing the game using a portable device, a head mounted display or other system that can connect to the game cloud system 114 over the network 112. As shown, the game cloud system 114 is configured to execute the game play 116. In one configuration, the game play is a streaming game, with play facilitated by the game cloud system 114. During the game play 116, a recording may be buffered to produce a recorded video 118. The recorded game play may include associated metadata 120. The metadata 120 includes state data and other saved parameter that can be used for re-executing the gameplay. The re-execution can enable replay using adjusted parameters, e.g., such as providing different camera views not provided in the recorded video 118. As mentioned above, the user may wish to share a portion of the game play and create a shared video 122. The sharing may be facilitated by pressing a share button of a controller, via voice input, or via a custom interface for selecting the size of the shared video 122. The shared video recording 122 will also include shared metadata 124.

According to the embodiment shown, the player 102 is illustrated playing a game in front of a monitor 108 using a controller 104. The controller 104 includes a share button and can provide input to the game. A computer 110 is connected to the monitor 108 through a wired connection or a wireless connection. The computer may be a game console, a PC, a plug-in stick, or the like. In this example, the camera 106 is positioned on top of the monitor 108 and is configured to capture the player 102 playing a video game while immersed in the gameplay. According to the embodiment shown, the computer 110 can communicate with the game cloud system 114 through network 112.

In some embodiments, the game cloud system 114 may include multiple data centers (not shown) and game server 115 that are configured to work together to provide wide access to players and users in a distributed and seamless fashion. According to the embodiment shown, the computer 110 is coupled to and can communicate with the game cloud system 114 through the network 112. The computer 110 can be configured to send game commands to the game cloud system 114 and the game server through the network 112. In addition, the computer 110 can be configured to receive encoded video streams (e.g., compressed) and decode the video streams received by the game cloud system 114. In some embodiments, the video streams may be presented to player 102 on a display and/or a separate device such as the monitor 108 or television. In some embodiments, the devices of the player can be any connected device having a screen and internet connection.

In some embodiments the game cloud system 114 and the game server 115 may be configured to receive, process, and execute data from the computer 110. In addition, the game cloud system 114 can be configured to process a recorded video 118 of the gameplay of the player 102. In one embodiment, the recorded video 118 may include a buffered portion of the gameplay. As illustrated, the recorded video 118 may include a corresponding gameplay metadata 120 that includes coded information, such as state data that identifies all of the actions, inputs, and moves made by the player 102 during player's 102 gameplay session, as well as any associated data required to recreate the gameplay for a different outcome of player actions, inputs and moves.

In some embodiments, the game cloud system 114 may be configured to process a portion of the recorded video 118, e.g., shared video recording 122. In some embodiments, the shared video recording 122 may be selected by the player 102 and specifically designated for sharing. For example, the player 102 may be playing a skiing game that involves a slopestyle competition that includes a variety of obstacles such as rails, jumps and other terrain park features. The recorded video 118 may include a recording of the player's gameplay of the entire slopestyle run. However, the player 102 may only want to select the portion of the run that shows the player's performance on the second obstacle because the player executed a trick that the resulted in a high score. Accordingly, the shared video recording 122 may vary in length and only include the portion of the gameplay that the player 102 selects to share with others.

Figure 2:
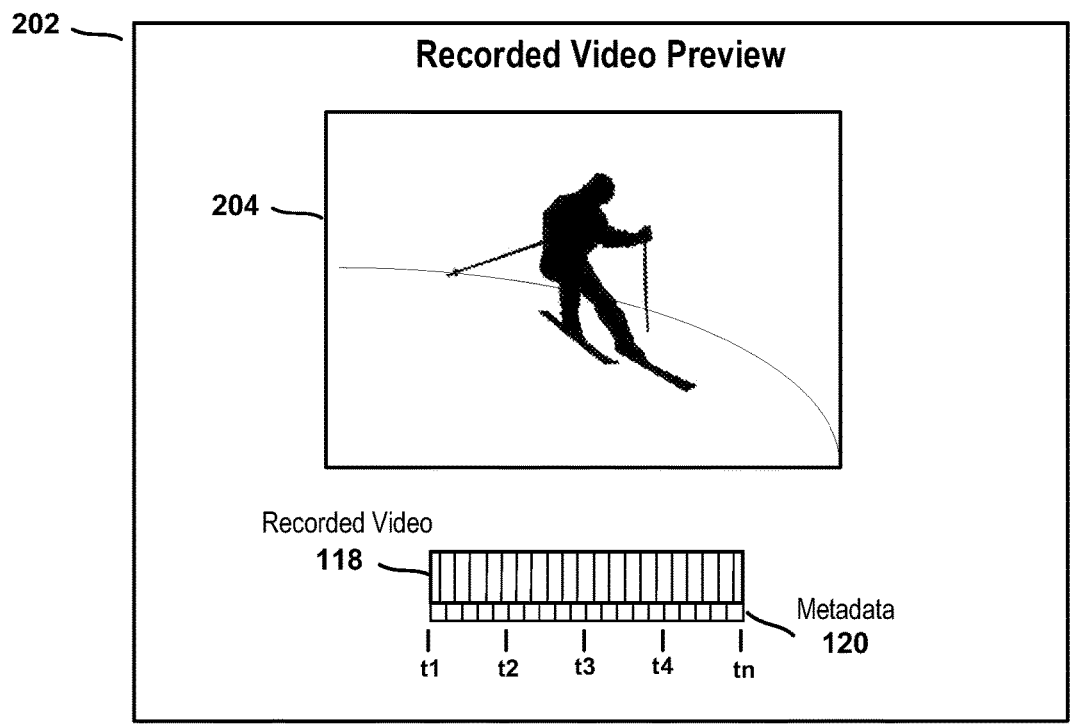
FIG. 2 illustrates an embodiment of a user interface after a player shares their gameplay, in accordance with an implementation of the disclosure.

FIG. 2 illustrates an embodiment of a user interface 202 after the player 102 shares a recording of their gameplay. In one embodiment, after the player 102 presses on a share button located on the controller 104 to share their gameplay, the recorded video 118 and its corresponding metadata 120 are identified. The recorded video 118 may be buffered in storage associated with the server and the server may be collecting and saving the metadata 120 in a similar manner. As illustrated, a visual representation of the recorded video 118 and the metadata 120 are shown and can vary in length, e.g., t1-tn. The metadata 120 may include coded information, such as state data that identifies all of the actions, inputs, and moves made by the player 102 during player's 102 gameplay session. The state data may also include game seed data that can be used to replay the game in substantially the same state and environment as the original gameplay.

In some embodiments, the user interface 202 may include a thumbnail 204 that provides a preview of the recorded gameplay. The thumbnail 204 can be an image taken from the recorded video 118 and used to provide users with a glimpse into the recorded video 118. In some embodiments, when a player 102 presses on the controller's 104 share button, the system automatically saves a portion of the recorded video 118 and corresponding metadata 120. In one embodiment, the system automatically selects and saves a buffered portion of the gameplay which includes only a portion of the gameplay (e.g., 10 minutes of the gameplay). In other embodiments, when the player 102 presses on the share button, the player 102 can specifically define how much of the gameplay the player wishes to share with others.

Figure 3A:
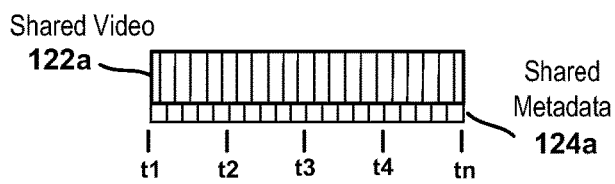
FIGS. 3A-3D illustrate various embodiments of a shared video recording and its corresponding shared metadata, in accordance with an implementation of the disclosure.
Figure 3B:
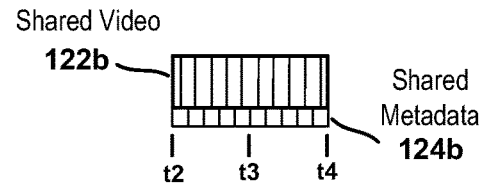
Figure 3C:
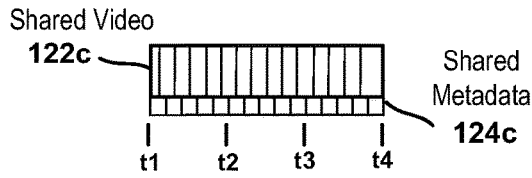
Figure 3D:
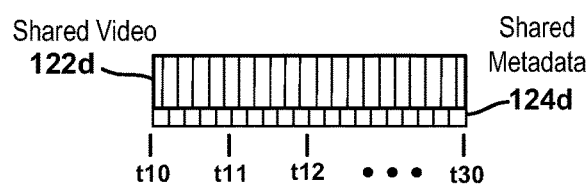

FIGS. 3A-3D illustrate various embodiments of a shared video recording 122 and its corresponding shared metadata 124. As noted above, when the player 102 presses on the share button on their controller 104 to share their gameplay, the player 102 can specifically define how much of gameplay and which specific events in the game to share. In other embodiments, instead of pushing a share button on the controller 104, the sharing can be activated via an in game command, an icon, a voice input, a selection screen, an option interface or other type of input. As illustrated in the figures, the length of the shared video recording 122 and its corresponding shared metadata 124 can vary and depend on the selection by the player 102. For example, a player may be playing an Olympic skiing game that includes four different events such as aerials, moguls, ski halfpipe, and ski slopestyle. Accordingly, FIG. 3A may represent a shared video 122a recording and its shared metadata 124a that includes a recording of all four events (e.g., aerials, moguls, halfpipe, and slopestyle). In other embodiments, the shared video recording 122 and corresponding shared metadata 124 may include only selected portions of the Olympic skiing gameplay (e.g., halfpipe competition, aerials competition, highlights, post-event analysis, awards ceremony, etc.) which are illustrated in FIGS. 3B-3D. Accordingly, the player 102 has the discretion to choose which events to share with others and the length of the shared video will vary and depend on what the player selects.

Figure 4:
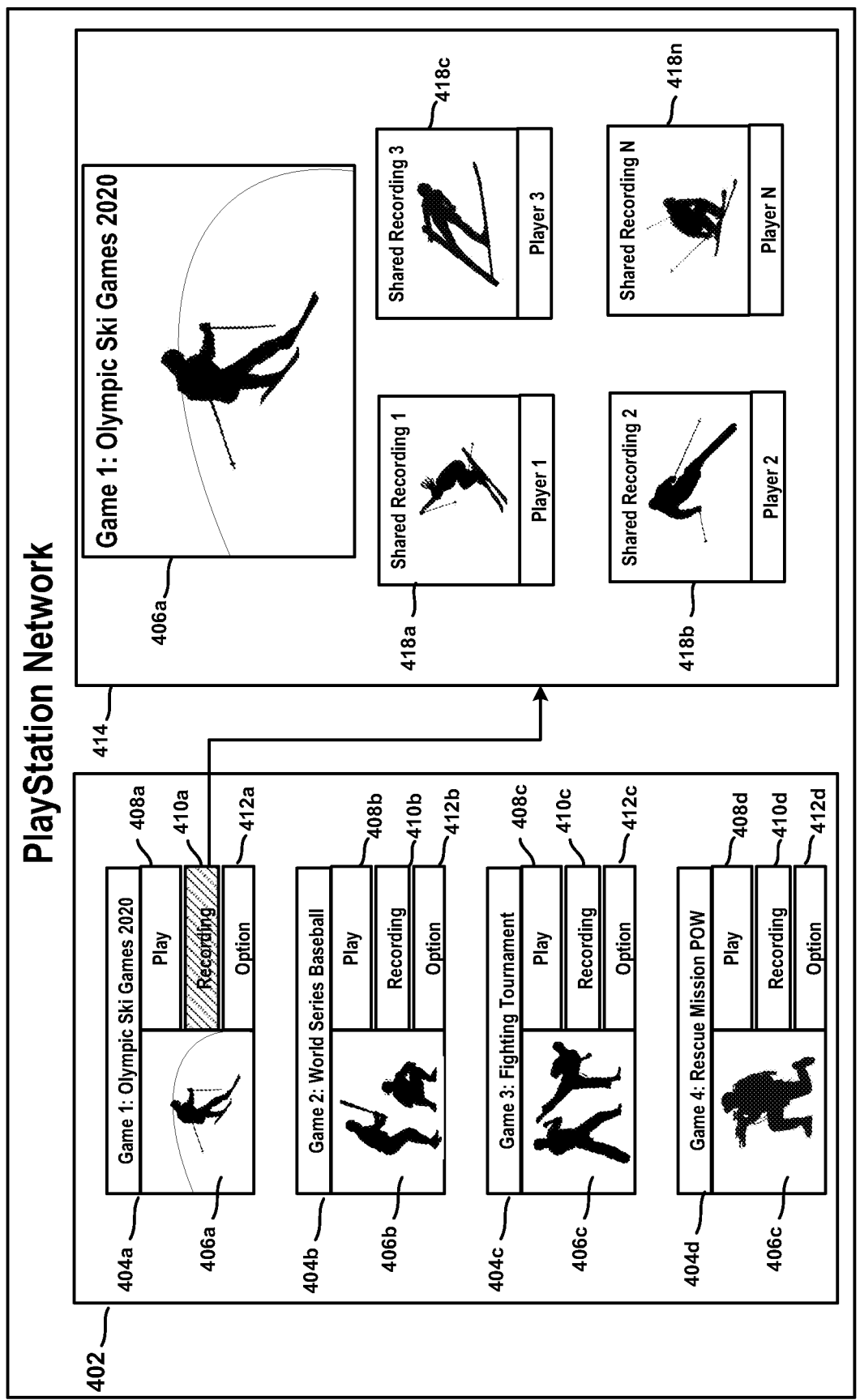
FIG. 4 illustrates an embodiment of an interface (e.g., game cloud system) that provides a game list interface and a recording list interface, in accordance with an implementation of the disclosure.

FIG. 4 illustrates an embodiment of an interface (e.g., game cloud system) that provides a game list interface 402 and a recording list interface 414. In one embodiment, the game list interface 402 is illustrated showing a listing of games that have been played and shared by the players 102. Each video game listing includes a game menu 404 with various features that the user can select from to preview and explore features associated with the game. For example, as shown in FIG. 4, the game list interface 402 includes four different video games (e.g., Olympic Ski Games 2020, World Series Baseball, Fighting Tournament, and Rescue Mission POW, respectively) with corresponding game menus, e.g., 404a-404d.

In one embodiment, each game menu 404 may include features such as a game preview 406 that provides a preview of the game, a play option 408 that enables a demo to be played, a recording option 410 to view recordings of the game, and other options 412 (e.g., other similar games, purchase game, rent game, etc.) that the user may choose from. In one example, a user may enter the cloud game system and view the game list interface 402 to browse around and see what games are available. The user might have an interest in first-person shooter games and game menu 404d (e.g., Game 4: Rescue Mission POW) might catch the user's attention. To preview the game, the user can select on the play option 408d to play a demo of the game and to determine whether the game is interesting.

In another embodiment, if the user selects the recording option 410 from one of the game menus 404, the system can generate a recording list interface 414 that corresponds to the selected video game. As shown in the illustration, the recording list interface 414 may include a game preview 406a that provides a general preview of the selected game (e.g., Game 1: Olympic Ski Games 2020). In another embodiment, the recording list interface 414 may include a plurality of shared recordings that are selectable by a user, e.g., shared recording interface 418a-418n. Each shared recording interface 418 corresponds to a specific event and/or scene in the gameplay that a player selected to share (e.g., shared video recording 122). For example, the recording list interface 414 includes various shared recordings for the video game, Olympic Ski Games 2020. As shown in the figure, the shared recording interface 418a may include a recording shared by Player 1 which shows the player participating in a slopestyle event where a skier is jumping off an obstacle. In another example, the shared recording interface 418c may include a recording shared by Player 3 which shows the player participating in a ski jumping event. In accordance with another embodiment, each shared recording interface 418 may include a thumbnail showing a preview of the shared recording to provide the user with a preview of the recording.

Figure 5:
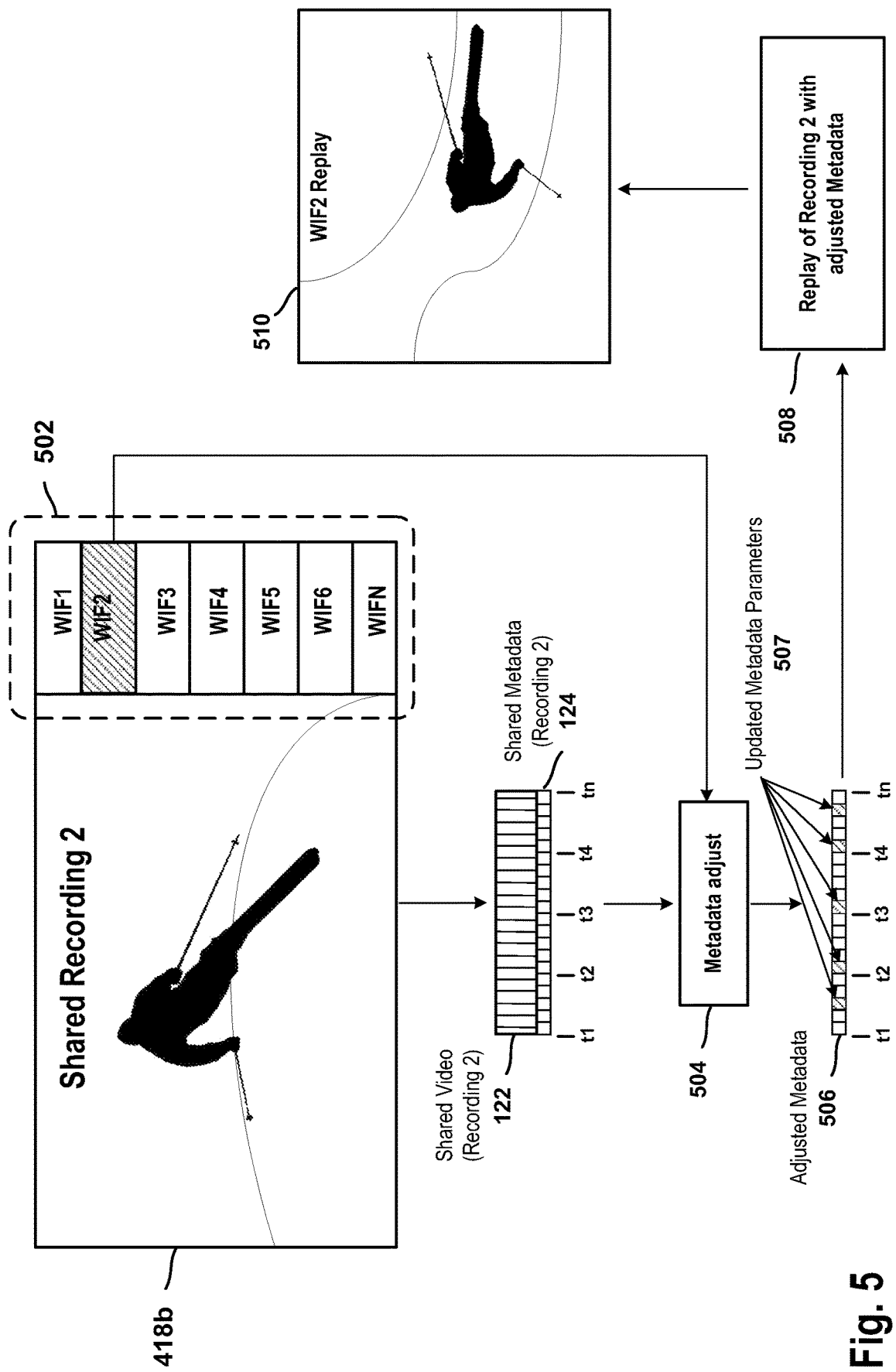
FIG. 5 illustrates an embodiment of a method for generating an alternative outcome of a previous gameplay when a player selects a what-if scenario from a menu containing one or more options for what-if scenarios.

FIG. 5 illustrates an embodiment of a method for generating an alternative outcome of a previous gameplay when a player 102 selects a what-if scenario from a menu 502 containing one or more options for what-if scenarios. In one embodiment, when a user selects a shared recording 418 from the recording list interface 414, an AI module can generate a menu 502 that includes one or more options of what-if scenarios for inclusion into the shared recording 418 interface. In some embodiments, the what-if scenarios can be customized for each user based on a profile associated with the user or learned behavior by the user. In one embodiment, the AI module implements one or more machine learning operations that ingest as inputs the shared video 122 recordings. In one embodiment, the ingested inputs are processed to identify features associated with the recordings. The features can then be processed using one or more classifiers of the AI module. The AI module can then apply rule based processing on outputs from the machine learning models. The rule based processing can, in some embodiments, use data from the player's profile, to further customize the selection of what-if scenario options 502 to include for the specific user viewing the shared recording. As noted above, without limitation, the profile associated with the user can include analysis data associated with the user selections, user non-selections, user comments, and/or user predicted tendencies. These inputs and associated processing by the AI module can thus be used to produce a short list of one or more what-if scenarios, to include in the menu 502, for a particular user.

For example, a user may be interested in fighting games and selects the Fighting Tournament game (e.g., FIG. 4, game menu 404c) to view the available shared recordings for the game. The user selects a shared recording that includes a player challenging the final boss character in the game. The AI module may process a profile of the user which indicates that the user has previously played the Fighting Tournament game but was unsuccessful when challenging the final boss character when using a character that specializes in wrestling. When deciding which what-if scenarios to include in the menu 502 for the particular user, the AI module may provide the user with various what-if scenarios that include non-wrestling characters (e.g., kick-boxing, karate, boxing, etc.) to challenge the final boss character in the game. The user may then select a what-if scenario to generate an outcome and determine whether any of the what-if scenarios results in the player defeating the final boss character. Accordingly, the use of the AI module may provide the user with various what-if scenarios that may be of interest to the user rather than presenting the user with what-if scenarios that the user may not have an interest in knowing or already knows its outcome. In some embodiments, the what-if scenarios may be custom selected by the user by selecting one or more sub-options of modifications.

In another embodiment, as discussed above, the shared video recording 122 includes the shared metadata 124. The shared metadata 124 may include coded information, such as state data that identifies all of the actions, game levels, game assets, inputs, and moves made by the player 102 during the player's 102 gameplay session in the shared video 122. The inputs, by way of example, may also include all controller inputs, e.g., button presses, selections, inertial data, directional movements, etc. The state data may also include game seed data, e.g., generated by the game during the game play session, to create background features, content, AI characters, and other unique content. The seed data, by way of example, can be used in order to replay the game in substantially the same state and environment as the original game play that produced the shared video recording 122.

When a user selects a what-if scenario from the menu 502, the method may further include a metadata adjust 504 operation that is configured to receive as input the shared metadata 124. The metadata adjust 504 operation can make adjustments to the shared metadata 124. In one embodiment, metadata parameters that correspond to a selected what-if scenario are updated to reflect the selected what if scenario to create the adjusted metadata 506. For example, as illustrated in FIG. 5, what-if scenario 2 (WIF2) is selected by the user. In this example, the WIF2 may be a scenario that includes game feature changes such as a skier using deep snow skis rather than standard skis. Accordingly, the metadata adjust 504 operation may update the parameters in the shared metadata 124 so that it corresponds to the skier using the deep snow skis rather than standard skis. Thus, after the metadata adjust 504 operation adjusts the parameters in the shared metadata 124, the method results in the generation of adjusted metadata 506 which includes one or more updated metadata parameters 507.

In another embodiment, more than one a what-if scenario may be selected from the menu 502. For example, a user can select and combine three what-if scenarios (e.g., WIF3, WIF7, WIF11) to determine the outcome of a skier competing in an alpine skiing event. The three what-if scenarios, e.g., WIF3, WIF7, WIF11, may be associated with descriptive features that include hard snow skis, alpine bindings, and short ski poles, respectively. The system can combine the selected what-if scenarios and update the corresponding metadata parameters to reflect the selected what-if scenarios. Using the adjusted metadata, the recording is replayed to generate the alternative outcome. Accordingly, the user may select more than one what-if scenario and combine various combinations to generate the alternative outcome.

In another embodiment, the method may further include a replay 508 operation that is configured to replay the selected shared recording using the adjusted metadata 506 to generate an alternative outcome of the previous gameplay. In the replay process, the replay 508 operation will use state data from the shared video recording 122 produced when the player previously played the game. This state data, in one embodiment, is included in the shared metadata 124. The replay 508 operation, in one embodiment, causes re-execution of the game code of the game using the adjusted metadata 506. As noted above, the adjusted metadata includes the updated metadata parameters 507 that corresponds to the selected what-if scenario and feature changes in the game. That is, an alternative outcome of the previous gameplay is now generated and may be different than the original outcome of the previous gameplay. In this embodiment, this enables the generation of an alternative outcome for the selected what-if scenario. The adjustment of metadata 504 may be processed using code that makes adjustments to parameters or changes parameters in the code. In some embodiments, certain parameters are known to be adjustable while others are not. By way of example, the adjustment may use a template that enables mapping functions to adjust and/or replace code and/or add code to make the modifications. In other configurations, some adjustments may be not allowed, and that code can be locked or not accessible to avoid runtime errors.

In another embodiment, the system is configured to determine whether a shared video recording already exists for a selected what-if scenario. In these cases, the replay 508 operation can replay the shared video recording 122 with the shared metadata 124 rather than using its resources to adjust the shared metadata.

After the replay 508 operation, generates an alternative outcome 510 for the selected what-if scenario (e.g., WIF2). In some embodiments, the alternative outcome 510 may be different than the outcome in the shared video recording because the adjusted metadata 506 is used to replay, i.e., re-execute the selected shared recording. For example, as noted above, WIF2 may be a scenario that includes a skier using deep snow skis rather than standard skis. As illustrated in the figure, when using the deep snow skis, the resulting alternative outcome 510 may show the skier progressing down the mountain at a faster speed than in the shared video recording.

FIG. 6A illustrates an embodiment of a what-if metadata profile table 602 for an exemplary video game (e.g., skiing video game). In one embodiment, the what-if metadata profile table 602 can include a plurality of what-if scenarios 604, various descriptive features 610 in the video game, original metadata parameters 606 that correspond to the descriptive features, and updated metadata parameters 507 that are used to replay the shared video recording. As illustrated, the what-if scenarios may include various features in the video game that can be changed. For example, the features may include ski types (e.g., all mountain skis, deep snow skis, hard snow skis, etc.), ski boots (e.g., comfort, high performance, etc.) bindings (e.g., alpine, frame AT, etc.) skier physical characteristics (e.g., tall, short, heavy, light, etc.), skier experience levels (e.g., beginner, intermediate, advance, etc.), etc. As mentioned above, some games will only allow certain types of adjustments. In one configuration, the types of adjustments allowed can be represented in descriptive features 610. For instance, it may not be possible to include a what-if to a game, such as skiing while sitting. Since this scenario does not make sense in the context of the game, those what-if adjustments are not made available to the user.

In one example, each what-if scenario 604 includes a descriptive feature 610a that corresponds to a feature in the video game that can be changed. For example, as shown in the what-if metadata profile table 602, what-if scenario 7 (e.g., WIF7) corresponds to a skier in the video game using alpine binding instead of the standard bindings when replaying the shared recording. WIF7 further includes the corresponding original metadata parameters 606a which identifies the specific parameters (e.g., P14 and P16) in the original metadata that will be update to reflect the alpine bindings. In addition, WIF7 includes the updated metadata parameters 507a which identifies the specific parameters (e.g., P14' and P16') that will be used in lieu of the original parameters when replaying the shared video recording.

FIG. 6B illustrates an embodiment of a composite what-if metadata profile table 612 for an exemplary video game (e.g., skiing game). In the illustrated implementation, the composite what-if metadata profile table 612 shows multiple what-if scenarios being combined to generate a replay of the shared video recording. The what-if metadata profile table 612 illustrates what-if scenario combination 604b, descriptive features 610b, original metadata parameters 606b, and updated metadata parameters 507b. In one embodiment, any combination of the what-if scenarios 604 can be combined to generate a desired what-if scenario to determine its outcome. For example, as illustrated in FIG. 6B, WIF1, WIF5, and WIF18 are combined to replay the recording. The combination includes the skier being an advanced skier using all mountain skis and comfort boots. Accordingly, the updated metadata parameters, e.g., P1', P5', P8', P11', P14', P41', and P43', may replace the original metadata parameters to create the adjusted metadata 506 which is used to replay the shared video recording.

Figure 7A:
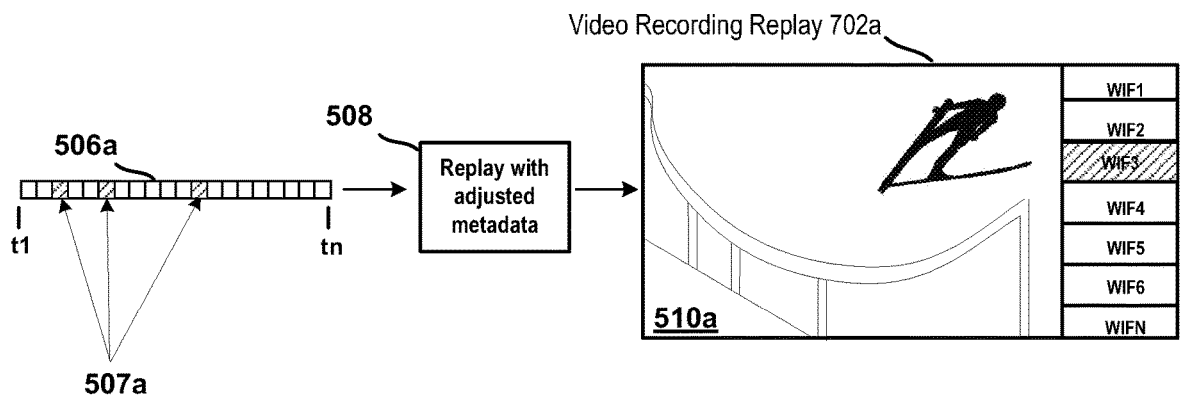
FIGS. 7A-7C illustrate various embodiments of the replay operation using the adjusted metadata and its updated metadata parameters to generate alternative outcomes of the previous gameplay, in accordance with an implementation of the disclosure.
Figure 7B:
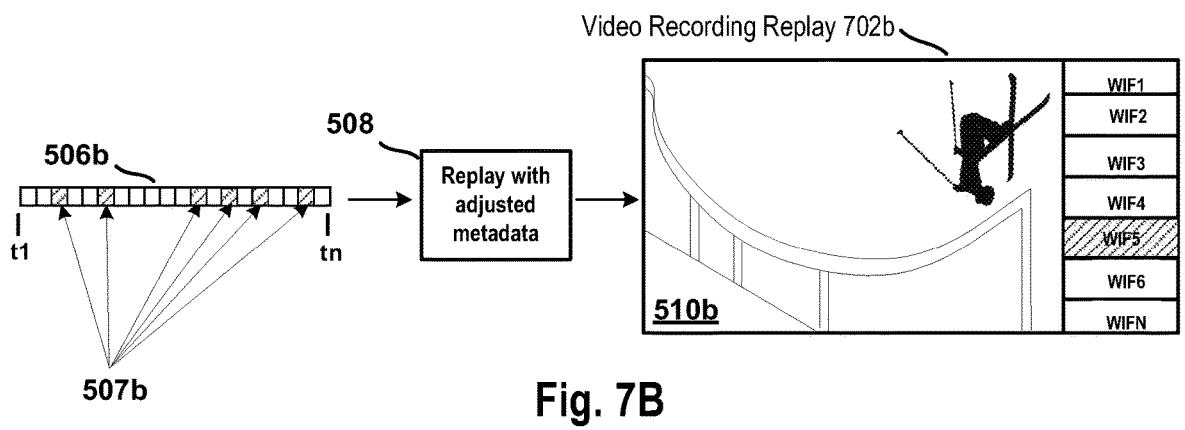
Figure 7C:
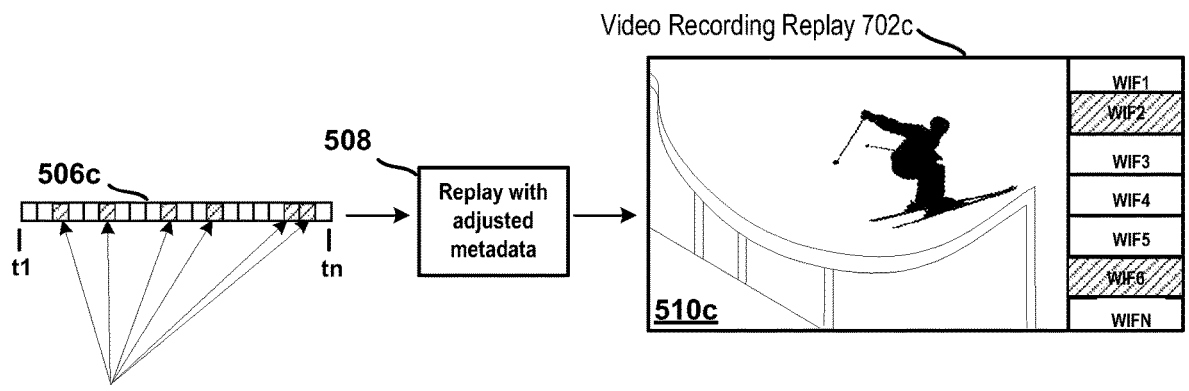

FIGS. 7A-7C illustrate various embodiments of the replay 508 operation using the adjusted metadata 506 (e.g., 506a-506c) and its updated metadata parameters 507 (e.g., 507a-507c) to generate an alternative outcome 510 (e.g., 510a-510c) of the previous gameplay. In some embodiments, when the replay operation 508 replays the shared video recording with the adjusted metadata 506, a video recording replay 702 is generated. The video recording replay 702 may include an alternative outcome 510 that is different than the original outcome of the previous gameplay. FIG. 7A illustrates the video recording replay 702a which includes the alternative outcome 510a after the replay 508 operation replays the shared video recording using the adjusted metadata 506a. The figure also illustrates the adjusted metadata 506a which includes the updated metadata parameters 507a. In some embodiments, the updated metadata parameters 507a corresponds to the selected what-if scenario and the corresponding feature changes in the game. In the example illustrated in FIG. 7A, the alternative outcome 510a is the result of what-if scenario 3 (WIF3). The alternative outcome 510a shows a skier jumping from a steep ramp and flying towards the sky. In this example, WIF3 may correspond to a feature change in the video game that includes a skier using wide skis that are made of lightweight fiberglass material.

In another embodiment, FIG. 7B illustrates the resulting video recording replay 702b which includes the alternative outcome 510b after the replay 508 operation replays the shared video recording using the adjusted metadata 506b. In some embodiments, the updated metadata parameters 507b corresponds to the selected what-if scenario and the corresponding feature changes in the game. In this example, the alternative outcome 510b is the result of what-if scenario 5 (WIF5). As illustrated, the alternative outcome 510b shows a skier jumping off a ski ramp and landing upside down on their head. In this example, WIF5 may correspond to feature changes such as an inexperienced skier using all mountain skis and short ski poles.

In another embodiment, FIG. 7C illustrates the resulting video recording replay 702C which includes the alternative outcome 510c after the replay 508 operation replays the shared video recording using the adjusted metadata 506c. In some embodiments, the updated metadata parameters 507c corresponds to the selected what-if scenario and the corresponding feature changes in the game. In the illustrated example, the alternative outcome 510c was generated using what-if scenario 2 (WIF2) and what-if scenario 6 (WIF6). The figure illustrates a skier jumping off a ski ramp and completing a smooth landing off the ramp. In this example, WIF2 may correspond to the skier being an advanced skier, and WIF5 may correspond to feature changes that include the use of hard snow skis, alpine bindings, and medium length ski poles.

Figure 8:
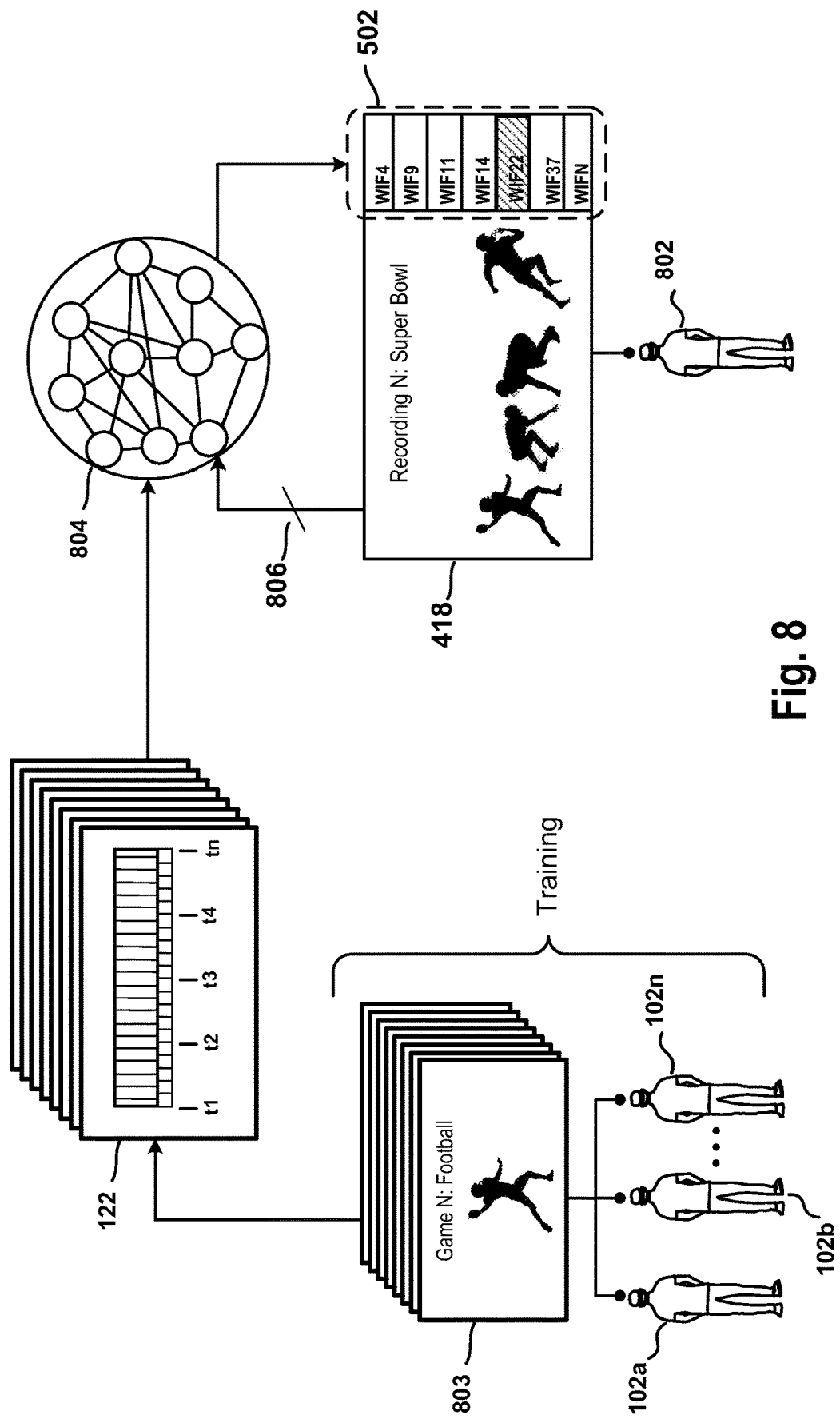
FIG. 8 illustrates an embodiment of a method for generating an alternative outcome of a previous gameplay using an artificial intelligence (AI) module to provide a user with a customized interface that includes one or more what-if scenarios for the previous gameplay, in accordance with an implementation of the disclosure.

FIG. 8 illustrates an embodiment of a method for generating an alternative outcome of a previous gameplay using an AI module 804 to provide a user 802 with a customized interface that includes one or more what-if scenarios for the previous gameplay. According to the shown embodiment, the method includes a plurality of players 102 playing a game 803. The games 803 played by the players 102 may vary and include various genres such as action games, fighting games, role playing games, shooting games, sports games, etc. In some embodiments, during a player's 102 gameplay, the player may select a portion of their gameplay to be recorded and shared with user 802 on the game cloud system.

The method flows to the generation of the shared video recording 122. In one embodiment, the player 102 may initiate and share their gameplay by presses on the share button located on the controller 104. When the player 102 initiates the sharing feature, the shared video recording 122 and its corresponding shared metadata 124 can be automatically generated. In one embodiment, the shared video recording 122 may include a buffered portion of the gameplay (e.g., previous 10 minutes of the gameplay). In other embodiments, the shared video recording 122 can be a portion of the recorded video 118 that is selected by the player. For example, a player 102 playing a football game may share a recording that includes the entire gameplay because the player played a Super Bowl championship game and wants to share the entire game with other users. Alternatively, the player 102 may only share certain scenes within the gameplay that shows the player 102 scoring points in the game (e.g., completing a touchdown, kicking a field goal, defensive plays resulting in a safety, etc.).

In another embodiment, the method flows to an AI module 804 that implements one or more machine learning operations that ingest one or more inputs to determine which what-if scenarios to include in the menu 502 for a particular user. In some embodiments, these inputs may include the shared video recordings 122 and its corresponding shared metadata 124, a profile associated with the user 802, and user feedback 806. In one embodiment, the AI module 804 can process the shared video recordings 122 and its corresponding shared metadata 124 to identify descriptive features in the game that are adjustable. These descriptive features may include corresponding metadata parameters that can be updated and used to replay the recording to generate an alternative outcome of the previous gameplay. For example, the shared video 122 may be a recording of a player playing a skiing game. After processing the shared video recording 122, the AI module 804 may determine a variety of descriptive features in the game that can be adjusted. These descriptive features may include ski types, ski boots, ski bindings, skier physical characteristics, skier experience levels, ski terrains and environment's (e.g., powder snow, compact snow, jumps, rails, kinks, etc.), etc. These features, along with outcomes from use of those features can be further processed to identify specific what-if scenarios that can be used for other users.

In one embodiment, the features used to identify what-if scenarios can be pre-identified by a developer of a game. For example, the features can be pre-defined to be adjustable for the game. Still further, features that are pre-defined to be adjustable for the game can be coded as part of the game. That is, the code of the game can include information that is coded by developers that help identify what types of features can be adjusted to then identify what type of what-if scenarios would be possible. This pre-defining of features, in one embodiment, can be done to avoid use of machine learning. In another embodiment, a developer of the game may provide the AI module 804 with additional data to assist with the selection of what-if scenarios to include in the menu 502. In another embodiment, the additional data provided by the developer, the AI module 804 may determine a more accurate list of what-if scenarios that the user might have an interest in replaying. In one embodiment, instead of using the AI module 804 to select the what-if scenarios, the developer may identify the features and the associated what-if scenarios to include in the menu 502 for a particular user. In accordance with another embodiment, the AI module 804 may be configured to process the profile associated with the user 802 to help generate the what-if scenario options for the user 802. The user profile may include user attributes such as gender, age, gaming experience, gameplay history, gaming skill level, preferences, interests, disinterests, etc. For example, the AI module 804 may process a shared video recording 122 that was selected by a user 802 that includes a recording of a third down attempt in a football game. A profile of the user may indicate that the user's previous gameplay of football games primarily includes the user throwing the ball to a wide receiver rather than handing the ball to a running back. When generating the what-if scenario options for the user, the AI module may generate various what-if scenarios that includes various passing routes where the quarterback throws the ball to a wide-receiver or a tight-end because the user's profile indicates that the user generally likes football plays that involves throwing the football.

In accordance with another embodiment, the AI module 804 may be configured to process the user feedback 806 to help generate the what-if scenario options for the user 802. In some embodiments, the user feedback 806 may include user selections, user non-selections, and/or user comments. The user feedback 806 may further help capture additional characteristics of the user since the feedback is provided directly from the user. Accordingly, the user feedback 806 may help improve the accuracy of the what-if scenario options for inclusion into the what-if scenario menu 502. By way of example, the machine learning model of the AI module 804 may use the user feedback 806 to identify specific features in the game that the user might be interested in. As mentioned above, the AI module 804 may use one or more machine learning models, classifiers, and rules to predict candidate what-if scenarios. Further processing of the predictions can filter the what-if scenarios to those that best fit the game context and the user's profile. As noted in the example above, in a football game, the user may be presented with several what-if scenarios that include various passing routes to receivers and only a few running back routes where the quarterback hands the ball to a running back. If the user only selects the what-if scenarios that include the passing routes, the user non-selections (e.g., running back routes) can be used as a feedback 806 to the machine learning model. This type of feedback feeds back into the machine learning model to reinforce the system's understanding of the user's likes and dislikes. In this example, the system may take into consideration the context of the user's non-selection and infer that the user may have an interest in plays involving pass routes to receivers rather than plays involving running back routes.

In accordance with another embodiment, the AI module 804 may be configured to determine which descriptive features in game are commonly adjusted by other users. For each shared video recording 122, the machine learning model of the AI module 804 may determine which what-if scenarios other users have selected for a given recording. Alternatively, the machine learning model can determine which what-if scenarios are generally not selected by other users. The most common what-if scenarios for a given shared video recording can be selected for inclusion into the interface for a user.

In some embodiments, each what-if scenario may include a weighting factor to help determine which specific what-if scenario to select for a user's menu 502 and inclusion into the shared recording interface 418. In one embodiment, the AI module 804 may assign a higher weighting factor to those what-if scenarios that the user 802 may have a higher likelihood of preferring. Accordingly, during the selection of one or more what-if scenarios to be included into the menu 502, what-if scenarios with a higher weighting factor may have a higher priority to be selected for inclusion into the menu 502. For example, based on the profile and feedback 806 of a user, the user may have an interest in several sports which may include skiing, football, and kickboxing. The feedback 806 of the user may reveal that the user is a risk taker and seeks adventurous outcomes that may have a high likelihood of failing. Accordingly, a higher weighting factor would be assigned to what-if scenarios that involves more risks (e.g., skier jumping off the largest jump, quarterback throwing a hail marry pass to win a game, kickboxer going for a one punch knockout, etc.) rather than those what-if scenarios that are risk adverse.

In another embodiment, the method flows to generating a what-if scenario menu 502 based on the AI module 804 output for inclusion into the shared recording interface 418. As shown in the FIG. 8, the what-if scenario menu 502 may include a plurality of what-if scenarios (e.g., WIF4, WIF9, WIF11, etc.) that the user 802 may select to generate the alternative outcome of the previous gameplay. As noted above, each what-if scenario may be assigned a corresponding higher weighting factor. In one embodiment, the what-if scenarios may be sorted in order in descending order based on its weighting factor. In other embodiments, the what-if scenarios may be sorted in order in ascending order. In some embodiments, the what-if scenario menu 502 can be filtered to include only what-if scenarios that has weighting factor that meets a certain threshold value.

In accordance with another embodiment, after the user 802 is provided with a shared recording interface 418 that includes the what-if scenario menu 502, the user 802 may select one of the what-if scenarios from the available options. For example, as illustrated in FIG. 8, the shared recording interface 418 includes a gameplay of a scene in a Super Bowl football game (e.g., Recording N: Super Bowl). The what-if scenario menu 502 indicates that WIF22 was selected to replay the recording of the Super bowl football game with the adjusted metadata. In this example, WIF22 may correspond to descriptive features in the game that includes a passing corner route where the wide receivers run straight down the field a long distance (40-50 yards), and then angle out towards the end zone and sideline. In another embodiment, the user 802 may select more than one what-if scenario. If multiple what-if scenarios are selected, the system may combine the what-if scenarios and adjust the corresponding metadata parameters to replay the recording.

In accordance with another embodiment, after the user 802 selects one or more what-if scenarios from the what-if scenario menu 502, the method may further include replaying the shared recording 122 using the adjusted metadata 506 to generate an alternative outcome of the previous gameplay. As noted above, in the replay process, the system will use state data from the shared video recording 122 which is included in the shared metadata 124. The state data may also include game seed data that can be used to replay the game in substantially the same state and environment as the original game play. In one embodiment, some of the parameters of the shared metadata 124 can be adjusted to correspond to the descriptive features for the selected what-if scenario, thus, resulting in adjusted metadata 506. In the replay process, the system will use the adjusted metadata 506 to re-execute the game code of the game to recreate the game for the selected what-if scenario. Accordingly, an alternative outcome of the previous gameplay is now generated and may be different than the original outcome of the previous gameplay.

In another embodiment, the system is configured to enable continuing gameplay after a what-if scenario selection and playback has occurred. In one example, the embodiment includes identifying an end of the alternative outcome and generating a save point for the end of the alternative outcome, enabling a continued play of the game after the end of the alternative outcome using the save point. In another example, the system includes identifying a beginning and an end of the alternative outcome. Then, enabling a continued play of the game before beginning of the alternative outcome.

In still another example, after a What-If scenario selection has been made by the user, it is replayed to the user like or as a video. Then after that section (e.g., Skier lands correctly from a jump or makes a tight corner), the user is asked if they wish to continue live gameplay at that point. If they chose to continue the game, then gameplay for the user resumes and they can continue playing the rest of the game or game session.

In one embodiment, uses of the described system could utilize the What-If scenario system to overcome difficult, frustrating or annoying sections of a game. Once the user decides to continue gameplay after the What-If scenario playback, a new save point is created as previously described, so a user does not have to replay the What-If scenario section over again if they wish.

In yet another embodiment, the What-If scenario system could be triggered deliberately by events predefined by a developer. For example, a game developer may choose to build an entire game around a whole What-If scenario system. This would allow developers to trigger the What-If system on any gameplay event: expired timers, specific locations, specific attributes of a user's in-game avatar, specific in-game events like a quest completion, or a particular object, or skill is gained, etc.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

Figure 9:
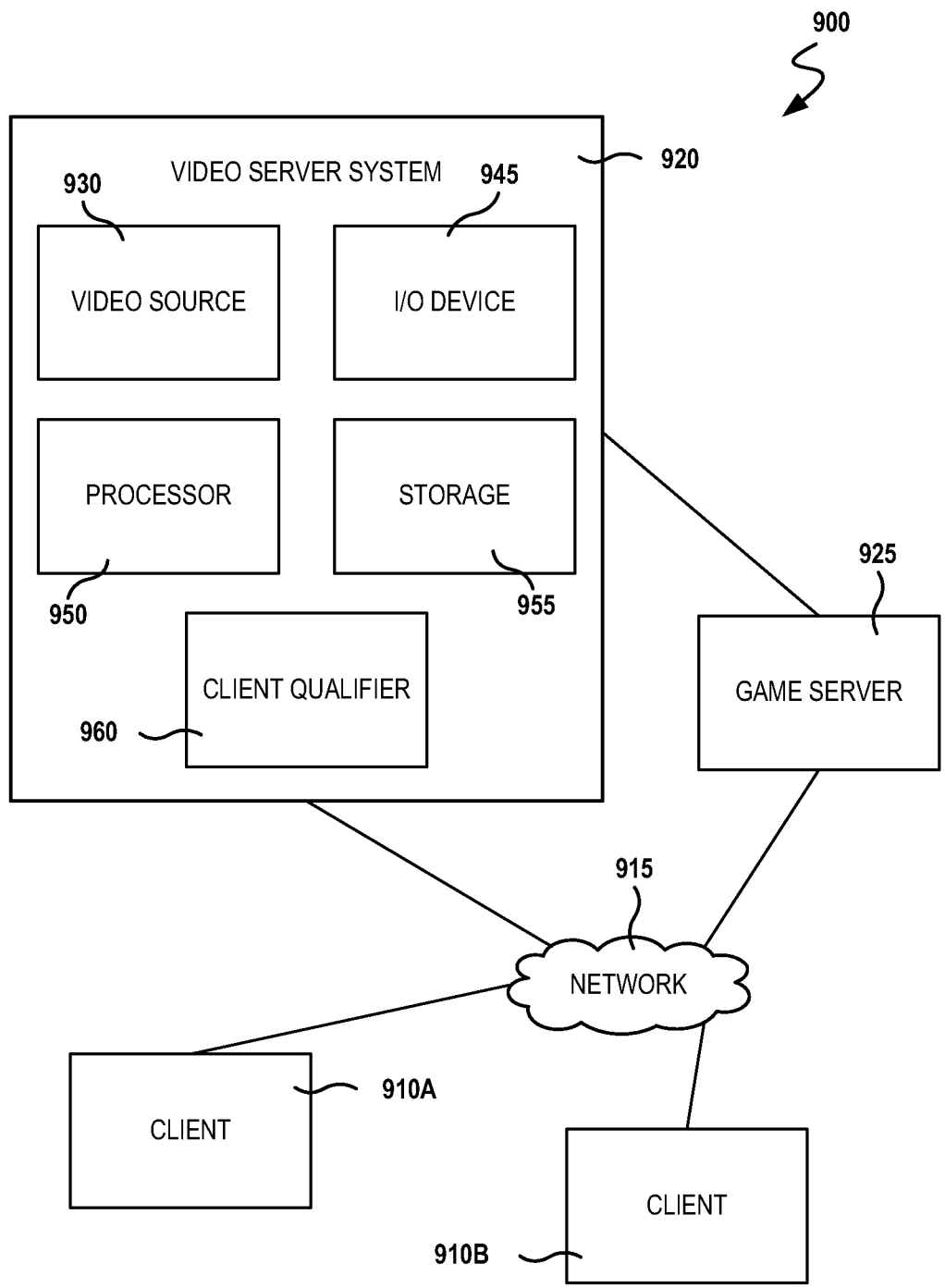
FIG. 9 is a block diagram of a Game System, according to various implementations of the disclosure.

FIG. 9 is a block diagram of a Game System 900, according to various implementations of the disclosure. Game System 900 is configured to provide a video stream to one or more Clients 910 via a Network 915. Game System 900 typically includes a Video Server System 920 and an optional game server 925. Video Server System 920 is configured to provide the video stream to the one or more Clients 910 with a minimal quality of service. For example, Video Server System 920 may receive a game command that changes the state of or a point of view within a video game, and provide Clients 910 with an updated video stream reflecting this change in state with minimal lag time. The Video Server System 920 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 910, referred to herein individually as 910A, 910B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 910 are configured to receive encoded video streams, decode the video streams, and present the resulting video to a user, e.g., a player of a game.

In some embodiments, instead of just processing the shared video 122 to generate what-if scenarios, it is possible to process other types of data. In one example, alternative data streams could be used. For instance, object based data could be sent from a game server to a client and then the client could render the game scene using this object data.

The processes of receiving encoded video streams and/or decoding the video streams typically includes storing individual video frames in a receive buffer of the Client. The video streams may be presented to the user on a display integral to Client 910 or on a separate device such as a monitor or television. Clients 910 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 910 are optionally geographically dispersed. The number of clients included in Game System 900 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 920 to deliver a game viewed through the HMD. In one implementation, the game console receives the video stream from the video server system 920, and the game console forwards the video stream, or updates to the video stream, to the HMD for rendering.

Clients 910 are configured to receive video streams via Network 915. Network 915 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 910 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 910 may, but are not required to, further include systems configured for modifying received video. For example, a Client may be configured to perform further rendering, to overlay one video image on another video image, to crop a video image, and/or the like. For example, Clients 910 may be configured to receive various types of video frames, such as I-frames, P-frames and B-frames, and to process these frames into images for display to a user. In some implementations, a member of Clients 910 is configured to perform further rendering, shading, conversion to 3-D, or like operations on the video stream. A member of Clients 910 is optionally configured to receive more than one audio or video stream. Input devices of Clients 910 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 910 is generated and provided by Video Server System 920. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 910 are typically configured to receive inputs from a user. These inputs may include game commands configured to change the state of the video game or otherwise affect game play. The game commands can be received using input devices and/or may be automatically generated by computing instructions executing on Clients 910. The received game commands are communicated from Clients 910 via Network 915 to Video Server System 920 and/or Game Server 925. For example, in some implementations, the game commands are communicated to Game Server 925 via Video Server System 920. In some implementations, separate copies of the game commands are communicated from Clients 910 to Game Server 925 and Video Server System 920. The communication of game commands is optionally dependent on the identity of the command Game commands are optionally communicated from Client 910A through a different route or communication channel that that used to provide audio or video streams to Client 910A.

Game Server 925 is optionally operated by a different entity than Video Server System 920. For example, Game Server 925 may be operated by the publisher of a multi-player game. In this example, Video Server System 920 is optionally viewed as a client by Game Server 925 and optionally configured to appear from the point of view of Game Server 925 to be a prior art client executing a prior art game engine. Communication between Video Server System 920 and Game Server 925 optionally occurs via Network 915. As such, Game Server 925 can be a prior art multiplayer game server that sends game state information to multiple clients, one of which is game server system 920. Video Server System 920 may be configured to communicate with multiple instances of Game Server 925 at the same time. For example, Video Server System 920 can be configured to provide a plurality of different video games to different users. Each of these different video games may be supported by a different Game Server 925 and/or published by different entities. In some implementations, several geographically distributed instances of Video Server System 920 are configured to provide game video to a plurality of different users. Each of these instances of Video Server System 920 may be in communication with the same instance of Game Server 925. Communication between Video Server System 920 and one or more Game Server 925 optionally occurs via a dedicated communication channel. For example, Video Server System 920 may be connected to Game Server 925 via a high bandwidth channel that is dedicated to communication between these two systems.

Video Server System 920 comprises at least a Video Source 930, an I/O Device 945, a Processor 950, and non-transitory Storage 955. Video Server System 920 may include one computing device or be distributed among a plurality of computing devices. These computing devices are optionally connected via a communications system such as a local area network.

Video Source 930 is configured to provide a video stream, e.g., streaming video or a series of video frames that form a moving picture. In some implementations, Video Source 930 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 925. Game Server 925 may maintain a copy of the state of the game based on game commands received from multiple players using geographically disperse clients. In these cases, the game state is provided by Game Server 925 to Video Source 930, wherein a copy of the game state is stored and rendering is performed. Game Server 925 may receive game commands directly from Clients 910 via Network 915, and/or may receive game commands via Video Server System 920.

Video Source 930 typically includes rendering logic, e.g., hardware, firmware, and/or software stored on a computer readable medium such as Storage 955. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 910. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 930 includes a video recording device such as a camera. This camera may be used to generate delayed or live video that can be included in the video stream of a computer game. The resulting video stream optionally includes both rendered images and images recorded using a still or video camera. Video Source 930 may also include storage devices configured to store previously recorded video to be included in a video stream. Video Source 930 may also include motion or positioning sensing devices configured to detect motion or position of an object, e.g., person, and logic configured to determine a game state or produce video-based on the detected motion and/or position.

Video Source 930 is optionally configured to provide overlays configured to be placed on other video. For example, these overlays may include a command interface, log in instructions, messages to a game player, images of other game players, video feeds of other game players (e.g., webcam video). In implementations of Client 910A including a touch screen interface or a gaze detection interface, the overlay may include a virtual keyboard, joystick, touch pad, and/or the like. In one example of an overlay a player's voice is overlaid on an audio stream. Video Source 930 optionally further includes one or more audio sources.

In implementations wherein Video Server System 920 is configured to maintain the game state based on input from more than one player, each player may have a different point of view comprising a position and direction of view. Video Source 930 is optionally configured to provide a separate video stream for each player based on their point of view. Further, Video Source 930 may be configured to provide a different frame size, frame data size, and/or encoding to each of Client 910. Video Source 930 is optionally configured to provide 3-D video.

I/O Device 945 is configured for Video Server System 920 to send and/or receive information such as video, commands, requests for information, a game state, gaze information, device motion, device location, user motion, client identities, player identities, game commands, security information, audio, and/or the like. I/O Device 945 typically includes communication hardware such as a network card or modem. I/O Device 945 is configured to communicate with Game Server 925, Network 915, and/or Clients 910.

Processor 950 is configured to execute logic, e.g. software, included within the various components of Video Server System 920 discussed herein. For example, Processor 950 may be programmed with software instructions in order to perform the functions of Video Source 930, Game Server 925, and/or a Client Qualifier 960. Video Server System 920 optionally includes more than one instance of Processor 950. Processor 950 may also be programmed with software instructions in order to execute commands received by Video Server System 920, or to coordinate the operation of the various elements of Game System 900 discussed herein. Processor 950 may include one or more hardware device. Processor 950 is an electronic processor.

Storage 955 includes non-transitory analog and/or digital storage devices. For example, Storage 955 may include an analog storage device configured to store video frames. Storage 955 may include a computer readable digital storage, e.g. a hard drive, an optical drive, or solid state storage. Storage 915 is configured (e.g. by way of an appropriate data structure or file system) to store video frames, artificial frames, a video stream including both video frames and artificial frames, audio frame, an audio stream, and/or the like. Storage 955 is optionally distributed among a plurality of devices. In some implementations, Storage 955 is configured to store the software components of Video Source 930 discussed elsewhere herein. These components may be stored in a format ready to be provisioned when needed.

Video Server System 920 optionally further comprises Client Qualifier 960. Client Qualifier 960 is configured for remotely determining the capabilities of a client, such as Clients 910A or 910B. These capabilities can include both the capabilities of Client 910A itself as well as the capabilities of one or more communication channels between Client 910A and Video Server System 920. For example, Client Qualifier 960 may be configured to test a communication channel through Network 915.

Client Qualifier 960 can determine (e.g., discover) the capabilities of Client 910A manually or automatically. Manual determination includes communicating with a user of Client 910A and asking the user to provide capabilities. For example, in some implementations, Client Qualifier 960 is configured to display images, text, and/or the like within a browser of Client 910A. In one implementation, Client 910A is an HMD that includes a browser. In another implementation, client 910A is a game console having a browser, which may be displayed on the HMD. The displayed objects request that the user enter information such as operating system, processor, video decoder type, type of network connection, display resolution, etc. of Client 910A. The information entered by the user is communicated back to Client Qualifier 960.

Automatic determination may occur, for example, by execution of an agent on Client 910A and/or by sending test video to Client 910A. The agent may comprise computing instructions, such as java script, embedded in a web page or installed as an add-on. The agent is optionally provided by Client Qualifier 960. In various implementations, the agent can find out processing power of Client 910A, decoding and display capabilities of Client 910A, lag time reliability and bandwidth of communication channels between Client 910A and Video Server System 920, a display type of Client 910A, firewalls present on Client 910A, hardware of Client 910A, software executing on Client 910A, registry entries within Client 910A, and/or the like.

Client Qualifier 960 includes hardware, firmware, and/or software stored on a computer readable medium. Client Qualifier 960 is optionally disposed on a computing device separate from one or more other elements of Video Server System 920. For example, in some implementations, Client Qualifier 960 is configured to determine the characteristics of communication channels between Clients 910 and more than one instance of Video Server System 920. In these implementations the information discovered by Client Qualifier can be used to determine which instance of Video Server System 920 is best suited for delivery of streaming video to one of Clients 910.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method of generating an alternative outcome of a previous gameplay, comprising:
   providing an interface that identifies one or more what-if scenarios for a previous gameplay;
   enabling selection of at least one of the what-if scenarios, the selection causes an adjustment to metadata associated with the previous gameplay, wherein the adjustment to metadata provides changes to parameters of the metadata; and
   replaying the previous gameplay using the adjusted metadata to generate an alternative outcome of the previous gameplay.

2. The method of claim 1, wherein the one or more what-if scenarios are selected for inclusion into the interface based on processing using a machine learning model.

3. A method of generating an alternative outcome of a previous gameplay, comprising:
   providing an interface that identifies one or more what-if scenarios for a previous gameplay;
   enabling selection of at least one of the what-if scenarios, the selection causes an adjustment to metadata associated with the previous gameplay; and
   replaying the previous gameplay using the adjusted metadata to generate an alternative outcome of the previous gameplay;
   wherein the one or more what-if scenarios being selected for inclusion into the interface is further based on data obtained from a profile of a user, the profile identifying performance of the user in the gameplay and other games played by the user.

4. The method of claim 1, wherein a machine learning model is used to identify what-if scenarios for a user, and options for what-if scenarios are provided to the interface.

5. The method of claim 4, wherein the machine learning model is configured to identify features from a recording of the previous gameplay that are adjustable or features that are adjusted by other users, or features that are pre-identified by a developer.

6. The method of claim 1, wherein the replaying is the previous gameplay is controlled at least in part by state data and inputs obtained from the metadata captured during the previous gameplay of a player.

7. The method of claim 1, wherein said adjusted metadata is based on the selected what-if scenario which causes adjustments to one or more parameters associated with the metadata.

8. The method of claim 1, wherein options for the what-if scenarios are filtered and provided to the interface based on a profile of the user.

9. A method of generating an alternative outcome of a previous gameplay for a game, comprising:
  providing an interface that identifies one or more what-if scenarios for the previous gameplay, the one or more what-if scenarios being selected for inclusion as options into the interface based on identifying features that are pre-defined to be adjustable for the game;
  enabling selection of at least one of the what-if scenarios from the options, the selection causes an adjustment to metadata associated with the previous gameplay, wherein the adjustment to metadata provides changes to parameters of the metadata; and
  replaying the game that was selected using the adjusted metadata to generate the alternative outcome of the previous gameplay.

10. The method of claim 9, wherein features that are pre-defined to be adjustable for the game are coded as part of the game.

11. The method of claim 9, wherein the one or more what-if scenarios being selected for inclusion into the interface is further based on processing by a machine learning model and one or more feedback inputs from the user.

12. The method of claim 9, wherein the one or more what-if scenarios being selected for inclusion into the interface is further based on processing by a machine learning model and a profile of the user, the profile identifying performance of the user in the gameplay and other games played by the user.

13. A method of generating an alternative outcome of a previous gameplay for a game, comprising:
  providing an interface that identifies one or more what-if scenarios for the previous gameplay, the one or more what-if scenarios being selected for inclusion as options into the interface based on identifying features that are pre-defined to be adjustable for the game;
  enabling selection of at least one of the what-if scenarios from the options, the selection causes an adjustment to metadata associated with the previous gameplay; and
  replaying the game that was selected using the adjusted metadata to generate the alternative outcome of the previous gameplay;
  wherein the replaying the recording is processed by automatically re-executing the game using the adjusted metadata to generate the alternative outcome, the alternative outcome being different than an outcome of the previous gameplay.

14. The method of claim 9, wherein the adjustment to the metadata is based on the selected what-if scenario which causes adjustments to one or more parameters associated with the metadata.

15. The method of claim 9, wherein the options for the what-if scenarios are filtered and provided to the interface based on a profile of the user.

* * * * *